United States Patent
Choi et al.

(10) Patent No.: US 12,418,444 B2
(45) Date of Patent: Sep. 16, 2025

(54) EQUALIZERS, COMMUNICATION SYSTEMS AND OPERATING METHODS THEREOF

(71) Applicant: Samsung Electronics Co., Ltd., Suwon-si (KR)

(72) Inventors: Young Choi, Suwon-si (KR); Jaeha Kim, Seoul (KR); Meyong Su Ko, Seoul (KR); Myoungbo Kwak, Suwon-si (KR); Jaewoo Park, Suwon-si (KR); Youngdon Choi, Suwon-si (KR); Junghwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 18/422,058

(22) Filed: Jan. 25, 2024

(65) Prior Publication Data
US 2024/0406041 A1  Dec. 5, 2024

(30) Foreign Application Priority Data
Jun. 2, 2023 (KR) .................. 10-2023-0071469

(51) Int. Cl.
H04L 25/06 (2006.01)
H04L 1/1867 (2023.01)

(52) U.S. Cl.
CPC .......... *H04L 25/062* (2013.01); *H04L 1/1874* (2013.01)

(58) Field of Classification Search
CPC ............................. H04L 25/062; H04L 1/1874
See application file for complete search history.

(56) References Cited

U.S. PATENT DOCUMENTS

| 6,192,072 B1 | 2/2001 | Azadet et al. |
| 7,327,808 B2 | 2/2008 | Lai |
| 7,599,461 B2 | 10/2009 | Aziz et al. |

(Continued)

FOREIGN PATENT DOCUMENTS

JP    2011151765 A    8/2011

OTHER PUBLICATIONS

James Bailey, "A 112-GB/s PAM-4 Low-Power Nine-Tap Sliding-Block DFE in a 7-nm FinFET Wireline Receiver, IEEE Journal of Solid-State Circuits" Jan. 15, 2022.

*Primary Examiner* — Janice N Tieu
(74) *Attorney, Agent, or Firm* — Randy J. Pritzker

(57) ABSTRACT

A receiver for receiving a data signal, comprising, an analog-to-digital converter configured to convert the data signal into digital data, a first-in-first-out buffer configured to determine a frame boundary of the digital data by referring to a comma index to output the digital data in units of data frames according to the determined frame boundary, a decision feedback equalizer configured to process a data frame output from the first-in-first-out buffer through a decision feedback equalization operation, wherein feedback data used in the decision feedback equalization operation of the data frame uses a predetermined fixed pattern, and a comma detector configured to generate the comma index by comparing a determined value of the data frame with the predetermined fixed pattern. The data frame may include a preceding data field in which a message is stored and a subsequent comma field having the same bit value as the fixed pattern.

20 Claims, 12 Drawing Sheets

(56) References Cited

U.S. PATENT DOCUMENTS

| | | | |
|---|---|---|---|
| 8,116,366 B2 | 2/2012 | Kawashima et al. | |
| 9,071,479 B2 | 6/2015 | Qian et al. | |
| 10,230,552 B1* | 3/2019 | Graumann | H04L 25/03057 |
| 11,477,057 B1 | 10/2022 | Bhuta et al. | |
| 11,489,657 B1* | 11/2022 | Lin | H03H 17/02 |
| 2010/0027606 A1* | 2/2010 | Dai | H04L 25/03019 |
| | | | 375/232 |
| 2023/0013802 A1 | 1/2023 | Gharibdoust et al. | |

\* cited by examiner

EQUALIZERS, COMMUNICATION SYSTEMS AND OPERATING METHODS THEREOF

CROSS-REFERENCE TO RELATED APPLICATION

This application claims priority under 35 U.S.C. § 119 to Korean Patent Application No. 10-2023-0071469, filed on Jun. 2, 2023, in the Korean Intellectual Property Office, and the contents of the above-identified application are incorporated by reference herein.

TECHNICAL FIELD

Aspects of the present disclosure relate to semiconductor devices, and more particularly, to receivers including fast decision feedback equalizers, communication systems, and operating methods thereof.

With the rapid increase in the supply of mobile devices and the rapid increase in the amount of internet access, the demand for high-speed data transmission is increasing daily. However, it may be difficult to satisfy demands for high-capacity and high-speed data transmission with non-return to zero (NRZ) channel modulation methods. Recently, Pulse Amplitude Modulation (PAM) methods have been actively studied as an alternative to a signal method for high-capacity and high-speed data transmission. Meanwhile, research is being conducted to improve the reliability of a received data signal by e.g., performing equalization on the data signal at a receiving end receiving the data signal.

Recently, high-speed interface technology based on ADC (Analog-to-Digital Converter) and DSP (Digital Signal Processing) is developing to a level of 100 Gbps or higher. Therefore, the operation speed of a decision-feedback equalizer DFE, which is a component of DSP, may also need to be higher than 100 Gbps. However, in the decision feedback equalizer DFE, it may be difficult to implement relatively high speeds due to data dependence due to the feedback path.

SUMMARY

Aspects of the present disclosure may provide high-speed decision feedback equalizers capable of overcoming data dependency caused by a feedback path, receivers including the same, and operating methods thereof.

According to some embodiments, a receiver for receiving a data signal is provided. The receiver may include: an analog-to-digital converter configured to convert the data signal into digital data, a first-in-first-out buffer configured to determine a frame boundary of the digital data by referring to a comma index to segment the digital data into units of data frames according to the determined frame boundary, a decision feedback equalizer configured to process a data frame output from the first-in-first-out buffer through a decision feedback equalization operation, wherein feedback data used in the decision feedback equalization operation of the data frame uses a predetermined fixed pattern, and a comma detector configured to generate the comma index by comparing a determined value of the data frame with the predetermined fixed pattern. The data frame may include a preceding data field in which a message is stored and a subsequent comma field having the same bit value as the predetermined fixed pattern.

According to some embodiments, a method of operating a receiver is provided. The receiver may include a decision feedback equalizer, and the method may include: converting a received data signal into a digital symbol stream, synchronizing the digital symbol stream into a data frame corresponding to a transmitted frame unit, and performing a decision feedback equalization operation on the data frame using a predetermined fixed pattern as a feedback decision value. The data frame may include a data field at the front end and a comma field at the end, and the comma field may have the same bit value as the predetermined fixed pattern.

According to some embodiments, a communication system may include: a transmitter configured to modulate a transmission data frame including a data field at a front end and a comma field at a rear end into an analog data signal and to transmit the modulated analog data signal, and a receiver configured to receive the analog data signal and to restore the data frame. The receiver may include: an analog-to-digital converter configured to convert the analog data signal into a digital symbol, and a digital signal processor configured to synchronize the digital symbol with the transmitted data frame using a comma index and to filter the synchronized data frame by applying a decision feedback equalization operation. Feedback data used in the decision feedback equalization operation may include a fixed pattern having a same bit value as the comma field.

BRIEF DESCRIPTION OF THE FIGURES

The above and other objects and features of the present disclosure will become apparent by describing in detail some examples of embodiments thereof with reference to the accompanying drawings.

DETAILED DESCRIPTION

It is to be understood that both the foregoing general description and the following detailed description merely provide some examples of embodiments, and it is to be considered that additional description of the claimed inventive concepts may be provided herein. Reference signs are indicated in detail in the described embodiments of the present disclosure, which are indicated with reference to the drawings. Wherever possible, the same reference numbers are used in the description and drawings to refer to the same or like parts.

Figure 1:
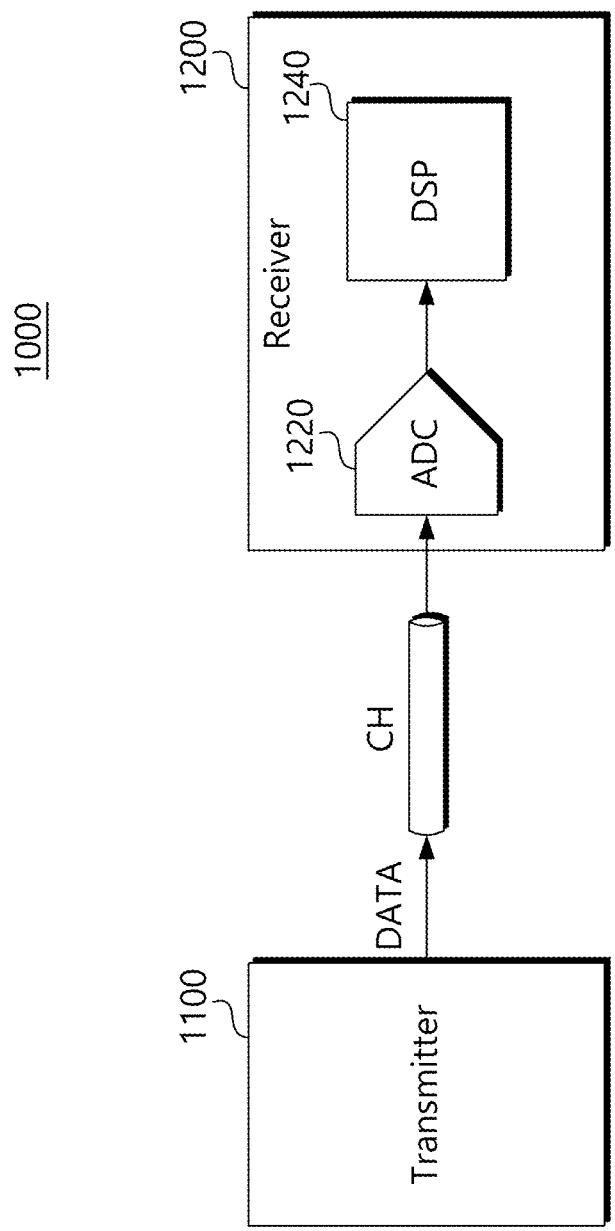
FIG. 1 is a block diagram showing a communication system according to some embodiments of the present disclosure.

FIG. 1 is a block diagram showing a communication system according to some embodiments of the present disclosure. Referring to FIG. 1, a communication system 1000 may include a transmitter 1100, a channel CH, and a receiver 1200. For example, the communication system 1000 may be or may include a wireless communication device, a cellular phone, a personal digital assistant PDA, a handheld device, a wireless modem, a wireless phone, a wireless station, a Bluetooth device, a health care device, or the like. It may also be used as or for a wearable device or the like. Also, as another example, the communication system 1000 may be or may include a semiconductor device and may be implemented as a storage device or memory system that stores data or provides stored data responsive to a request or command of a host.

The transmitter 1100 may transmit a data signal DATA to the receiver 1200 through a channel CH. The data signal DATA may be a pulse amplitude modulation (hereinafter referred to as PAMn) signal of multiple levels n. For example, as shown in FIG. 1, the transmitter 1100 may generate a data signal DATA representing 2-bit data at one level according to the PAM4 method. The data signal DATA may be implemented as a single signal and may be transmitted and received through a single channel CH between the transmitter 1100 and the receiver 1200.

In particular, a data frame transmitted from the transmitter 1100 of the present disclosure includes a fixed pattern DFE comma. Here, the data frame may be or may refer to a unit of symbols processed in filters such as a decision feedback equalizer (not shown) of the receiver 1200. That is, when N symbols are processed in a specific period in an equalization operation of the receiver 1200, the N symbols may be defined as one data frame. For example, in the case of a PAM4 receiver using a 64-way TI-ADC (Time interval Analog-to-Digital Converter), the number of symbols may be 'N=64', and one symbol represents 2 bits. Accordingly, one data frame in a 64-way PAM4 receiver may be composed of '2×N=128' bit data.

Figure 2:
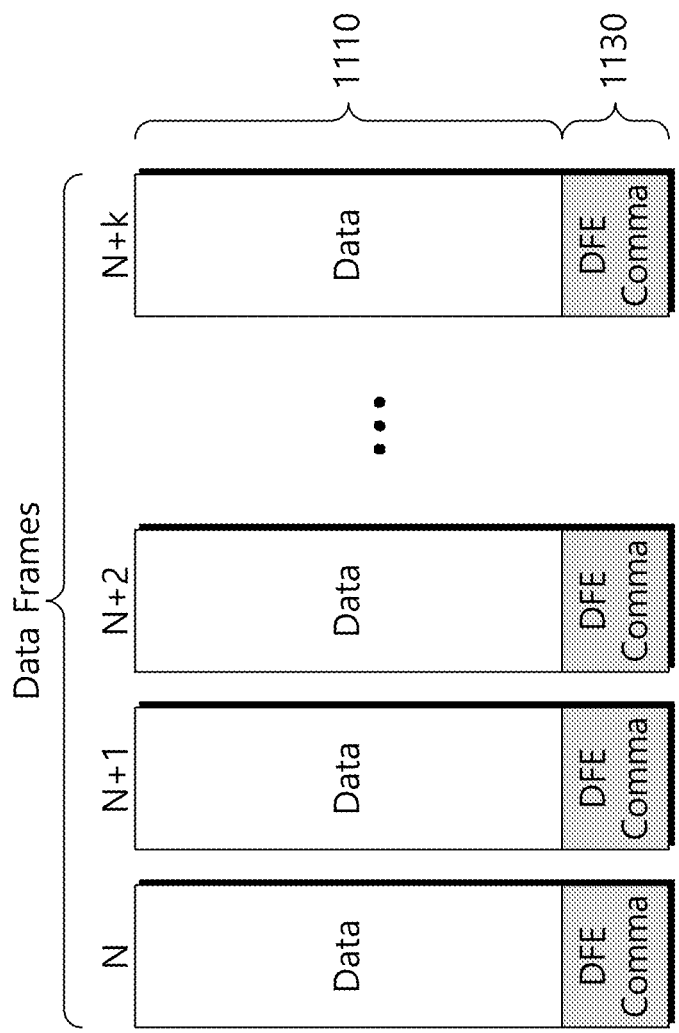
FIG. 2 is a diagram showing the structure of a data frame transmitted by a transmitter according to some embodiments of the present disclosure.

The transmitter 1100 may transmit a DFE comma of a predetermined fixed bit value for each data frame, described further with respect to FIG. 2. In particular, the DFE comma is located at the end of the data frame. As the DFE comma is arranged at the end of the data frame, feedback data of the decision feedback equalizer of the receiver 1200 may be provided with a fixed DFE comma value. It may be possible to reduce the latency due to the feedback path of the decision feedback equalizer by the fixed DFE comma. The length of the DFE comma may be longer than the number of taps of the decision feedback equalizer of the receiver 1200, as described further below.

A channel CH may be a physical storage medium or a data transmission medium. For example, the channel CH may be the storage medium of a memory device or may include copper cable, optical fibers, cables, wire, or a radio frequency RF channel. In the present disclosure, it has been described as being used in the communication system 1000 for data transmission of the PAM4 signaling method as an example, but the type of channel CH is not limited herein.

The receiver 1200 may include an analog-to-digital converter 1220 (hereinafter referred to as ADC) and a digital signal processor (DSP) 1240. The ADC 1220 converts the data signal DATA received as an analog signal into a digital signal. Also, the data signal DATA converted into a digital signal may be parallelized in data frame units by Serializer-Deserializers (SerDes) (not shown).

The ADC 1220 may include a TI (Time Interleaved)-ADC configured to use a relatively high sampling frequency. TI-ADC may be configured to implement the relatively high sampling frequency by operating multiple ADC channels in parallel, providing high conversion performance. The ADC 1220 may generate bits corresponding to each symbol from the input analog data signal DATA. For example, the ADC 1220 may convert a '01' symbol in a PAM4 type data signal DATA into a 2-bit or more symbol such as '01XXXXX' through oversampling. Data converted into digital form by the ADC 1220 may be parallelized in data frame units and may be transmitted to the digital signal processor 1240.

The digital signal processor 1240 may be configured to perform a decision feedback equalization operation for filtering inter-symbol interference ISI or noise on the data frame provided by the ADC 1220. In particular, the digital signal processor 1240 of the present disclosure may be configured to perform a high-speed pipelined decision feedback equalization operation on the data frame transmitted from the transmitter 1100. That is, the digital signal processor 1240 may be configured to utilize the DFE comma of the data frame to perform a high-speed decision feedback equalization operation.

In particular, in the decision feedback equalizer, in order to filter one data frame, at least some of the decision values of the previous data frame must be fed back. In addition, in order to perform a decision feedback equalization operation of a pipeline method during a plurality of stages, a path delay due to feedback may increase. A relatively large latency may occur in order for the decision value of the equalization operation to be provided to the operation of the next data frame through a feedback path such as a multiplier, an adder, or a slicer. The digital signal processor 1240 of the present disclosure may use a DFE comma of a predetermined fixed value in the decision feedback operation of the next data frame. Therefore, according to the techniques of the present disclosure, latency according to the feedback path can be minimized, so that a high-speed pipelined decision-feedback equalization operation may be possible. A specific structure of the digital signal processor 1240 will be described in detail later herein.

According to the above description, the communication system 1000 of the present disclosure may utilize a DFE comma provided as a fixed value to perform a decision feedback equalization operation on one data frame. Therefore, as a feedback value provided in the decision feedback equalization operation, a DFE comma of the predetermined fixed value may be used instead of a decision value of a previous data frame. Therefore, latency due to the feedback path of the decision feedback equalization operation may be minimized. In particular, since the DFE comma may be used as feedback data in multiple stages, it may be possible to speed up the decision feedback equalization operation of the pipeline method. As a result, in the communication system 1000 using the DFE comma of the present disclosure, it may be possible to increase the operating frequency of the decision feedback operation, thereby improving the throughput.

FIG. 2 is a diagram showing the structure of a data frame transmitted by a transmitter according to some embodiments of the present disclosure. Referring to FIG. 2, the transmitter 1100 may configure one data frame with data and may allocate specific bits at the end of the data frame as a DFE comma.

The transmitter 1100 may configure a transmission data stream with a plurality of data frames (N, N+1, N+2, . . . , N+k). A data frame may be a data unit processed by a decision feedback equalizer of the receiver 1200. Also, the transmitter 1100 may configure each data frame with a data field 1110 and a DFE comma field 1130. That is, the transmitter 1100 may allocate the last bits in each data frame as a DFE comma. The DFE comma may be a predetermined specific data pattern, and all data frames may have the same value of DFE comma.

In the decision feedback equalization operation of the receiver 1200, the decision value of the previous data frame should be provided as feedback data for the calculation of the current data frame. Accordingly, an operation on the current data frame may be started after the decision value of the previous data frame is output, which may delay the operation on the current data frame. However, if the last fields of a data frame according to the present disclosure are used as a fixed value DFE comma, the equalization operation of the next frame may be started without a delay until the decision value is output.

The length of the DFE comma may be equal to or longer than the number of taps of the decision feedback equalizer of the receiver 1200. For example, in the case of a 4-tap decision feedback equalizer used in a 64-way PAM4 receiver, the last 8-bits of every 128-bits can be allocated as a DFE comma of a pre-arranged fixed pattern. In other words, the transmitter 1100 may allocate and transmit the last 8-bits of a 128-bit data frame as a DFE comma of a fixed value such as '01010101'. Alternatively, when DC balance is required, the transmitter 1100 may alternately or cyclically transmit complement or complementary patterns such as the last 8-bit '00111111' and '11000000'.

As described above, the transmitter 1100 of the present disclosure may add and transmit a DFE comma of a fixed pattern in a data frame. According to the structure of the data frame, high-speed and low-power pipelined decision-feedback equalization operation in the receiver 1200 may be possible.

Figure 3:
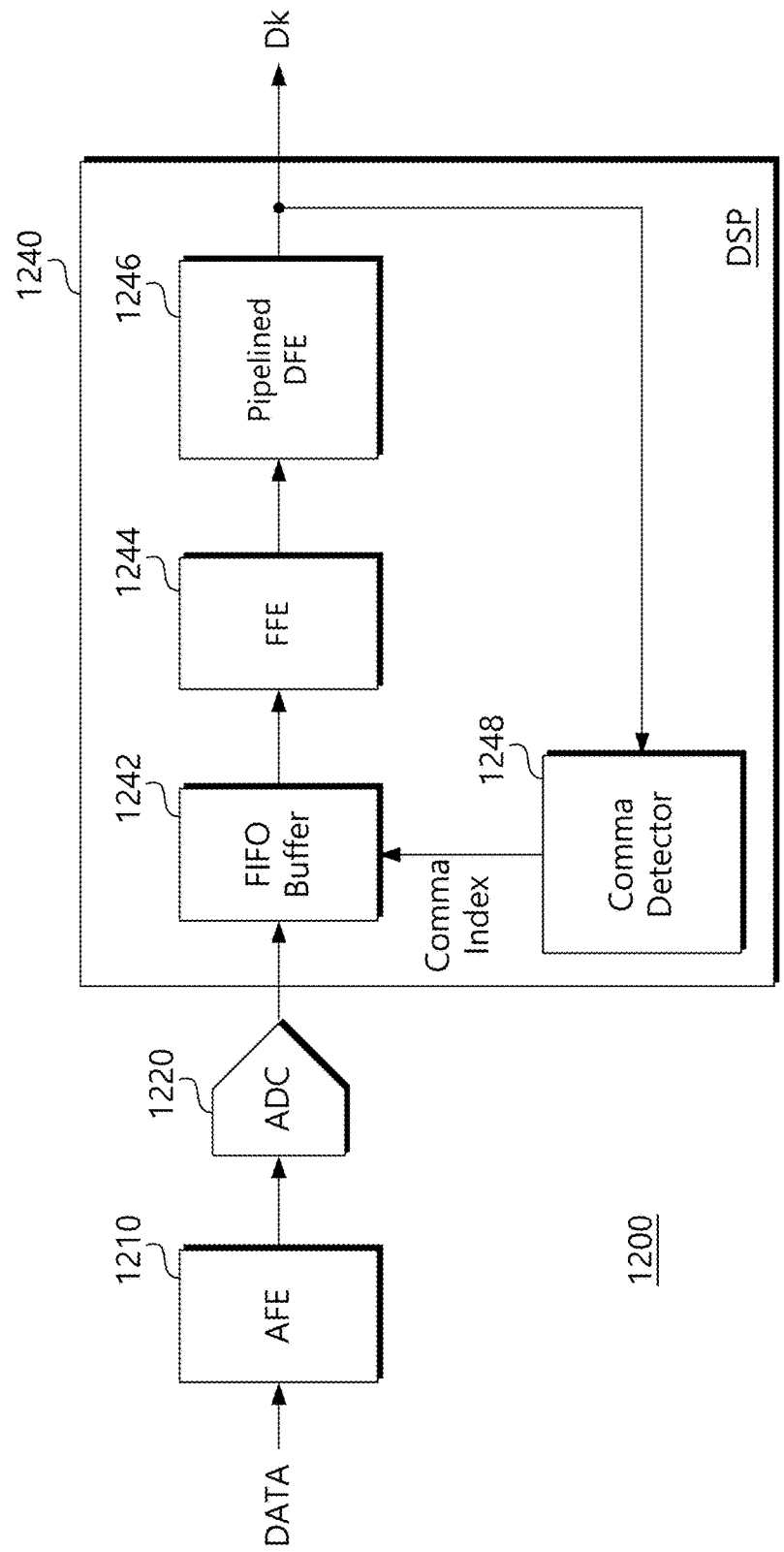
FIG. 3 is a block diagram showing an example of a structure of a receiver according to the present disclosure.

FIG. 3 is a block diagram showing an example of a structure of a receiver of the present disclosure according to some embodiments. Referring to FIG. 3, the receiver 1200 may include an analog front end (AFE) 1210, an ADC 1220, a first-in-first-out FIFO buffer 1242, a feed forward equalizer FFE 1244, a pipelined DFE 1246, and comma detector 1248. Here, the FIFO buffer 1242, the FFE 1244, the pipelined DFE 1246, and the comma detector 1248 may be included in the digital signal processor 1240.

The analog front end 1210 may perform analog processing on the data signal DATA transmitted through the channel CH. For example, the analog front end 1210 may include an analog filter or amplifier such as a continuous time linear equalizer CTLE or a variable gain amplifier VGA. In general, the channel CH in high-speed serial communication (e.g., more than 50 Gbps) may attenuate high-frequency signals more than low-frequency signals. Accordingly, the analog front end 1210 may include the continuous-time linear equalizer CTLE that amplifies the amplitude of the high-frequency components of the received signal. In addition, jitter and noise may be boosted according to the amplification of high-frequency components. Accordingly, the analog front end 1210 may include a variable gain amplifier VGA, which may be capable of variably amplifying the signal amplitude of a signal according to frequency.

The ADC 1220 may convert the analog signal output received from the analog front end 1210 into a digital signal. For example, the ADC 1220 may convert an analog signal transmitted in the PAM4 method into a multi-level digital signal. In some embodiments, the ADC 1220 may generate bits corresponding to one symbol including data bits and error information from one analog signal level. Also, a data stream corresponding to a plurality of symbols output from the ADC 1220 may be reconstructed into a data frame through a parallelizer.

The digital signal processor 1240 may be configured to perform a digital filtering operation on the output of the ADC 1220 to remove inter-symbol interference ISI or channel noise. In particular, the digital signal processor 1240 of the present disclosure may synchronize received frames using the DFE comma of data frames and may perform a high-speed pipeline equalization operation. The digital signal processor 1240 of the present disclosure may include the FIFO buffer 1242, the feed forward equalizer 1244, the pipelined decision feedback equalizer 1246, and the comma detector 1248.

The FIFO buffer 1242 may rearrange symbols output from the ADC 1220 in units of data frames. The ADC 1220 may perform digital conversion on symbol sequences without distinguishing the data frame determined by the transmitter 1100. Therefore, for the decision feedback equalization operation, symbol sequences must be rearranged in units of data frames. The FIFO buffer 1242 may synchronize and may rearrange these symbol sequences on a frame-by-frame basis, and transfers them to the feed forward equalizer 1244. The FIFO buffer 1242 may determine boundaries of symbols output from the ADC 1220 according to a comma index generated based on a decision value of the decision feedback equalization operation.

The feed forward equalizer 1244 may perform filtering on data frames output from the FIFO buffer 1242. The feed forward equalizer 1244 may remove effects of pre-ghost on symbols included in data frames. The feed forward equalizer 1244 may correct inter-symbol interference ISI for an input data frame. Here, the feed forward equalizer 1244 has been described as being located at the rear end of the FIFO buffer 1242, but the present disclosure is not limited thereto. In other words, the feed forward equalizer 1244 may be positioned before the FIFO buffer 1242. However, it is noted that the number of bits of data output from the feed forward equalizer 1244 may be greater than that of the FIFO buffer 1242. Therefore, it may be more desirable for the feed forward equalizer 1244 to be located after the FIFO buffer 1242.

The pipelined DFE 1246 may be configured to perform a decision feedback equalization operation on each of the data frames provided from the feed forward equalizer 1244 and may output a decision value Dk. In particular, the pipelined DFE 1246 may perform a high-speed decision feedback equalization operation by utilizing the DFE comma of the data frame. In order to perform the decision feedback equalization operation, the decision value Dk-1 determined in the previous data frame is used as feedback data in the operation of the subsequent data frame. In particular, when the decision feedback equalization operation is performed on data frames in a pipelined manner, the decision value Dk-1 may be generated only when the operation on the previous data frame is completed. Therefore, as the number of taps of the equalizer increases, the delay due to the increase of the feedback path inevitably increases.

The pipelined DFE 1246 of the present disclosure may provide the DFE comma of a fixed value located in the end of data frame at the start time of the decision feedback equalization operation of every data frame. The DFE comma may be a prearranged symbol pattern with the transmitter 1100 or may be provided in an alternating pattern considering DC balance. The pipelined DFE 1246 may include a memory for storing a fixed DFE comma.

The comma detector 1248 may be configured to detect position information of a DFE comma from a data frame corresponding to the decision value Dk of the decision feedback equalization operation. For example, the comma detector 1248 may compare the data frame of the decision value Dk output from the pipelined DFE 1246 with a pre-stored DFE comma, and may determine the location where the same pattern is detected as a comma index. For example, it is assumed that 4 symbols among 64 symbols are designated as DFE commas. The comma detector 1248 may be configured to provide location information corresponding to the DFE comma as a comma index in the received symbol sequence in units of data frames. Then, the FIFO buffer 1242 may place or align the DFE comma at the end of the data frame and may determine the boundary position of the data frames. The FIFO buffer 1242 may align and output the data frames according to the determined boundaries of the data frames.

According to the structure of the receiver 1200 described above, a high-speed pipelined decision-feedback equalization operation may be possible. By designating the last end of the data frame as a DFE comma with a fixed bit value, a high-speed pipeline-type decision feedback equalization operation may be possible without regard to latency.

Figure 4:
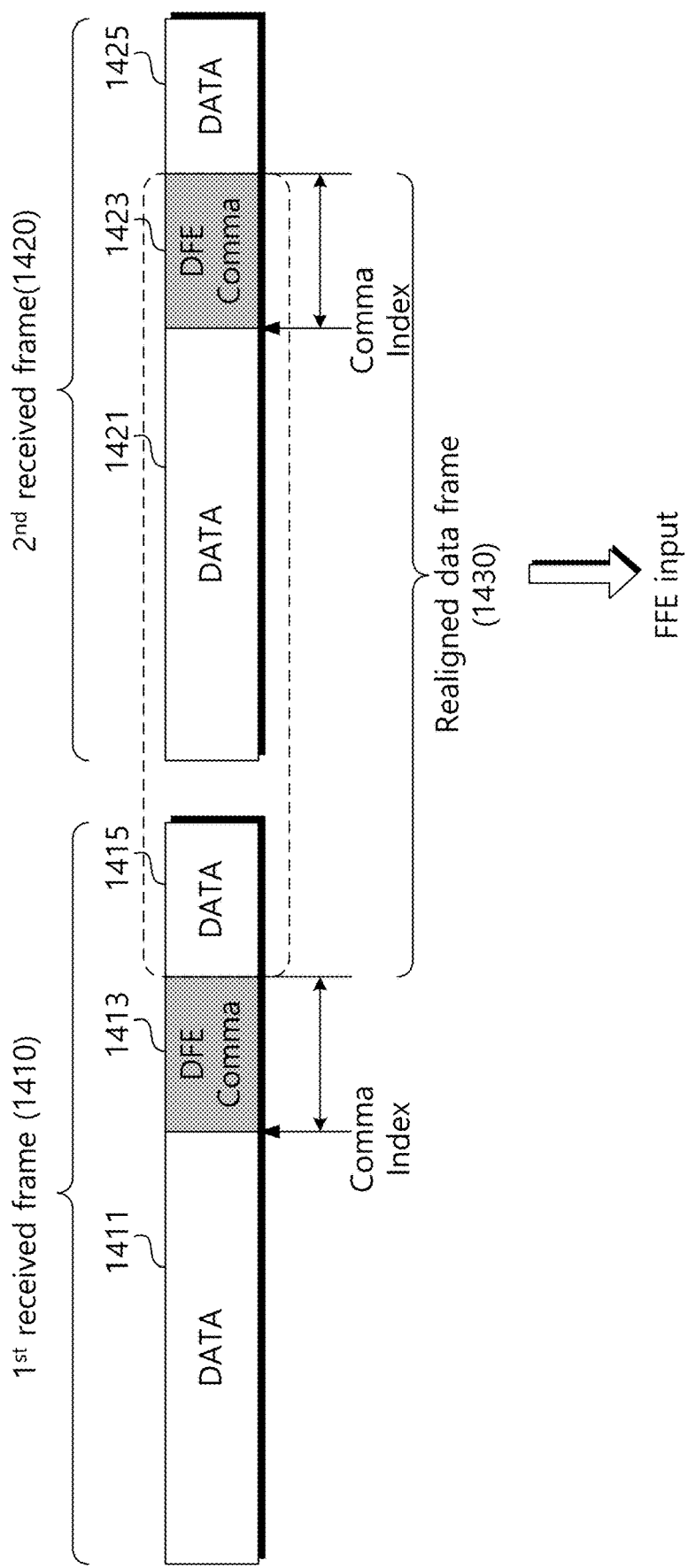
FIG. 4 is a diagram showing the function of the FIFO buffer of FIG. 3 by way of example.

FIG. 4 is a diagram showing a function of the FIFO buffer of FIG. 3. Referring to FIG. 4, the FIFO buffer 1230 may perform frame synchronization using a comma index on data frames, which may be randomly received from the ADC 1220. The data frames 1410 and 1420 output from the ADC 1220 may be substantially out of synchronization with frame units transmitted from the transmitter 1100.

That is, the first received frame 1410 transmitted from the ADC 1220 and the second received frame 1420 following it may be in an asynchronous state with the data frame transmitted from the transmitter 1100. For example, in the first received frame 1410, the DFE comma 1413 is not located at the end of the data frame. Also, the data symbols 1411 and 1415 are symbols belonging to different data frames when transmitted by the transmitter 1100. This asynchronous problem may also occur in the data symbols 1421 and 1425 of the second received frame 1420 and the DFE comma 1423.

For synchronization of the above-described received frames, the FIFO buffer 1230 may determine the boundary of the data frame based on the comma index provided from the comma detector 1248. The comma index may provide location information (e.g., exact location information) where the DFE comma 1413 is located. The FIFO buffer 1230 may store two consecutive asynchronous received frames 1410 and 1420, and may rearrange and output the DFE comma 1423 defined by the comma index to be located at the end of the data frame.

For example, if the first received frame 1410 is composed of 64-symbols and the DFE comma 1413 corresponds to the 46-th to 49-th symbols in the first received frame 1410, the comma detector 1248 may provide the comma index '46'. Then, the FIFO buffer 1230 may recognize the DFE comma 1413 as the last data of one data frame and may determine the data symbols 1415 and 1421 and the DFE comma 1423 in units of one data frame. Data symbols 1415, 1421, and 1423 may be determined as one sorted data frame 1430 by the FIFO buffer 1230. The sorted data frame 1430 may then be passed to a feed forward equalizer 1244.

Determination of the comma index for the above-described frame synchronization or frame rearrangement may be performed in an initialization phase of the communication system 1000 or in a training sequence of an interface circuit performed in a power-on operation. In the training sequence of the high-speed interface circuit, the comma index can be detected using the DFE comma of the fixed pattern of the present disclosure. In addition, a data frame alignment operation may be performed during normal operation using the detected comma index.

In concluding the description of FIG. 4, the FIFO buffer 1230 may reconstruct the received symbol sequence according to the boundary of the data frame into a new data frame unit using an comma index. The reconstructed data frame may be provided to the feed forward equalizer 1244.

Figure 5:
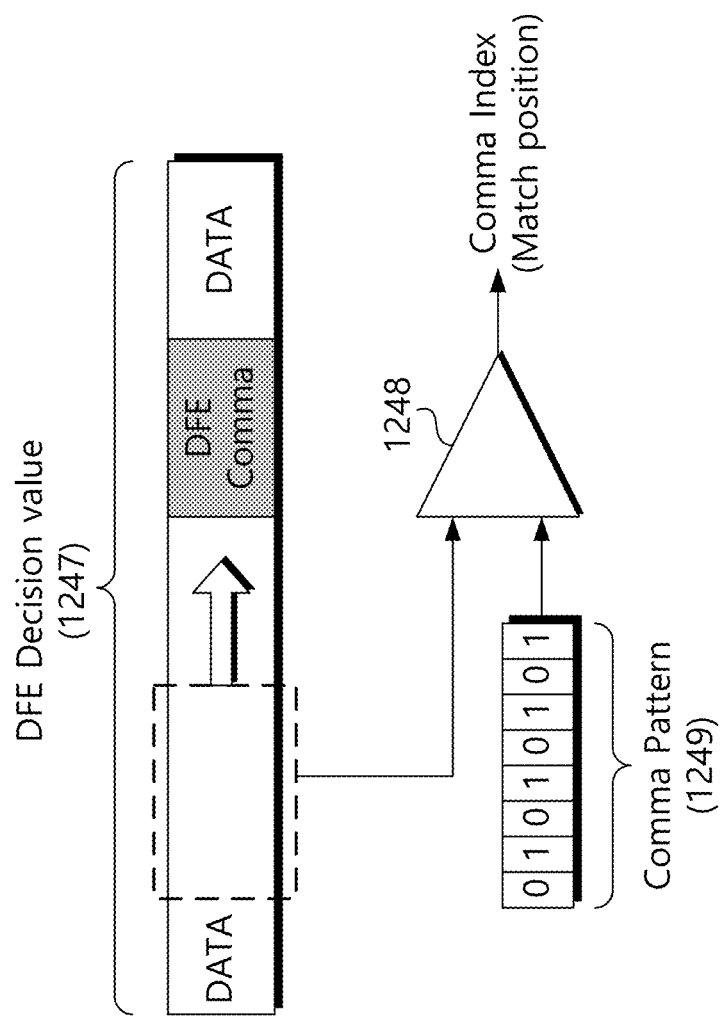
FIG. 5 is a diagram showing an example of a comma index generation method by the comma detector according to the present disclosure.

FIG. 5 is a diagram showing an example of a comma index generation method by the comma detector of the present disclosure. Referring to FIG. 5, a comma detector 1248 may generate a comma index corresponding to DFE comma position information of a data frame from a DFE decision value 1247 output from a pipelined DFE 1246.

The comma detector 1248 may output the position of the data frame matching the predetermined comma pattern 1249 as a comma index. The comma detector 1248 may compare the symbols of the data frame output as the DFE decision value 1247 with the comma pattern 1249. In addition, the comma detector 1248 may provide a symbol position matching the comma pattern 1249 as a comma index. For example, when the comma pattern 1249 is '01010101', the comma detector 1248 may compare the DFE decision value 1247 with the comma pattern 1249 while sliding sequentially. If the 8-bit DFE determination value 1247 matches the comma pattern 1249, the comma detector 1248 may output the corresponding position as a comma index.

Comma index generation of the comma detector 1248 may be implemented as part of a training sequence during initialization or booting of the communication system 1000. Alternatively, the comma index generation of the comma detector 1248 may be performed in real time during normal operation of the communication system 1000 or periodically or when determined to be necessary.

Figure 6:
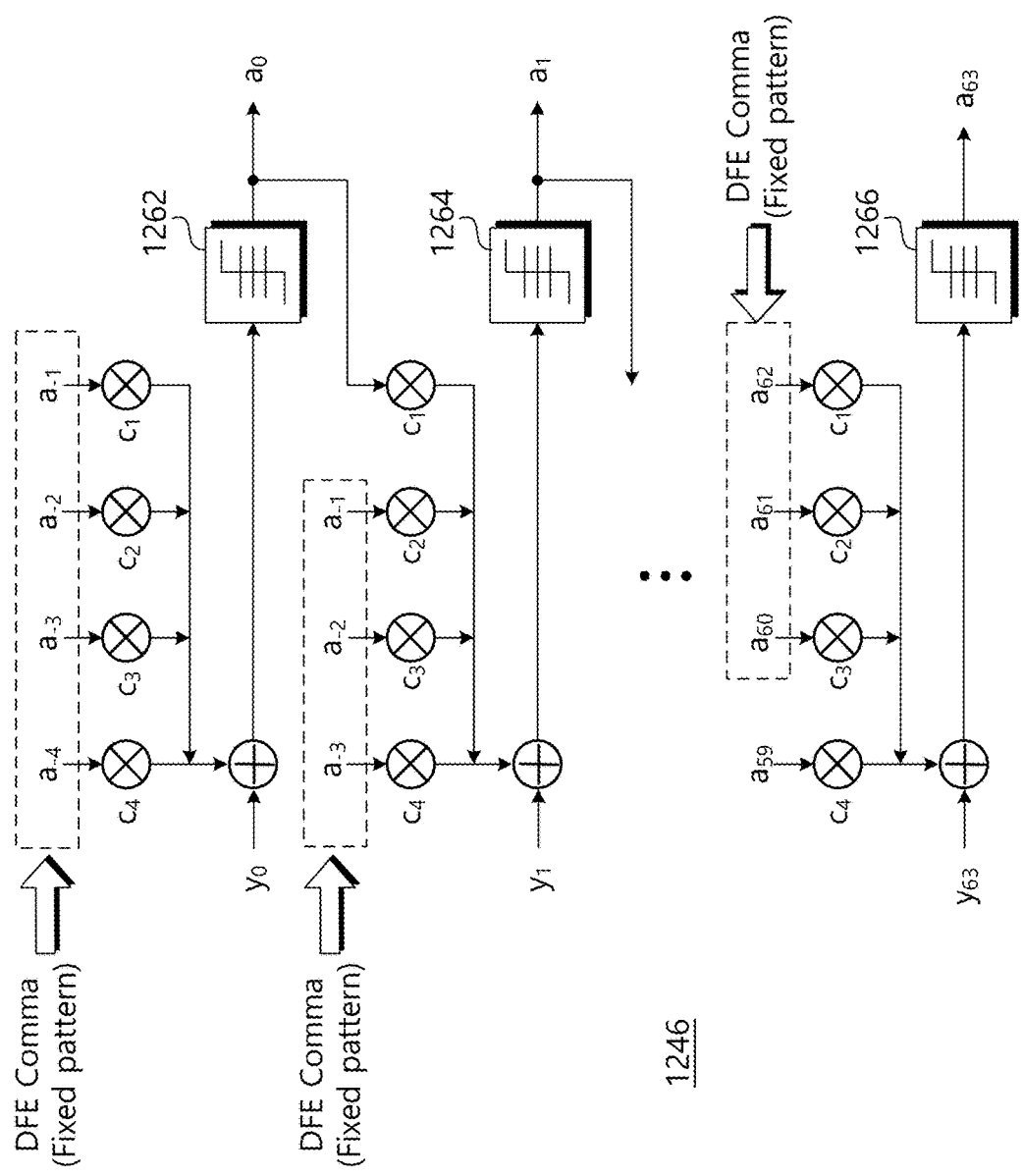
FIG. 6 is a diagram showing an example of a topology of a pipelined DFE of the present disclosure.

FIG. 6 is a diagram showing an example of a topology of a pipelined DFE of the present disclosure. Referring to FIG. 6, the pipelined DFE 1246 may be configured as a 4-tap/64-way PAM4 decision feedback equalizer that performs 16-stage pipeline operations.

Here, input values $y_0$ to $y_{63}$ of the pipelined DFE 1246 input to the adders may be outputs of the feed forward equalizer 1244 (see FIG. 3). Upon receiving input values $y_0$ to $y_{63}$ corresponding to one data frame, the pipelined DFE 1246 may perform a 16-stage pipeline operation. To apply the four taps, each of the tap coefficients $c_1$ to $c_4$ is provided with DFE decision values $a_0$ to $a_{63}$ output from the slicers 1262, 1264, and 1266. That is, for the decision feedback equalization operation for one input value $y_n$, four DFE decision values $a_{n-1}$ to $a_{n-4}$ must be multiplied with each tap coefficient and added to the input value $y_n$. And the added result is determined as PAM4 symbol data by the slicer. Here, each input value $y_0$ to $y_{63}$ or each DFE decision value $a_0$ to $a_{63}$ corresponds to 2-bits in PAM4.

Since 4-tap is applied to the PAM4 signal in the pipelined DFE of the above-described topology, the DFE comma may be the last 4 symbols $a_{60}$ to $a_{63}$ of the data frames $a_0$ to $a_{63}$ or 8-bits. In other words, the DFE comma may be the last 4 symbols $a_{60}$ to $a_{63}$ of the data frames $a_0$ to $a_{63}$ or 8-bits corresponding thereto. In the pipelined DFE of the illustrated topology, the four DFE decision values $a_{-1}$ to $a_{-4}$ may be DFE decision values for the four symbols $a_{60}$ to $a_{63}$ of the previous data frame. However, regardless of the decision value of the previous data frame, the four symbols $a_{60}$ to $a_{63}$ used in the subsequent decision feedback operation may be assigned a fixed value DFE comma. Thus, pipelined DFE 1246 may use the DFE comma provided as a fixed value. For example, the four DFE decision values ($a_{-1}$ to $a_{-4}$) used for the decision feedback operation for the input value $y_0$ may be provided as fixed DFE commas $a_{-1}$, $a_{-2}$, $a_{-3}$, $a_{-4}$. Then, after multiplying the DFE commas ($a_{-1}$, $a_{-2}$, $a_{-3}$, $a_{-4}$) and the tap coefficients ($c_1$ to $c_4$), the sum of the input value $y_0$ is transmitted to the slicer 1262. The slicer 1262 may output the DFE decision value $a_0$ for the input value $y_0$ according to the decision feedback operation. In the same manner, the DFE decision value $a_1$ for the input value $y_1$ may also be calculated by the 4-tap decision feedback operation. In this case, DFE comma values ($a_{-1}$, $a_{-2}$, $a_{-3}$) may be used as feedback values.

Here, 8-bits located at the end of the data frame may be allocated as DFE commas, and the DFE commas can be adjusted in various patterns for power efficiency or error performance. For example, '00111111' and '11000000' can be alternately used for DFE comma for DC balance.

In the above structure of the pipelined DFE 1246, since the DFE comma of a fixed value is located at the end of a data frame, there may be no need to wait for the decision value of the previous data frame for the decision feedback equalization operation. A fixed pattern of bit values equal to the DFE comma may be used as a feedback value required at the start of the decision feedback equalization operation for one data frame. Thus, the pipelined DFE 1246 can start the decision feedback equalization operation of the current data frame relatively quickly and even if the DFE decision value of the previous data frame does not exist or does not yet exist.

In addition, it might not be necessary to use the decision value of the decision feedback equalization operation currently in progress for the calculation of the next data frame, so that data frames can be continuously processed without latency due to the feedback path. In addition, the pipelined DFE 1246 according to the present disclosure may perform multi-stage pipeline operations on one data frame at high speed, thereby improving the throughput of decision feedback equalization operations.

Figure 7:
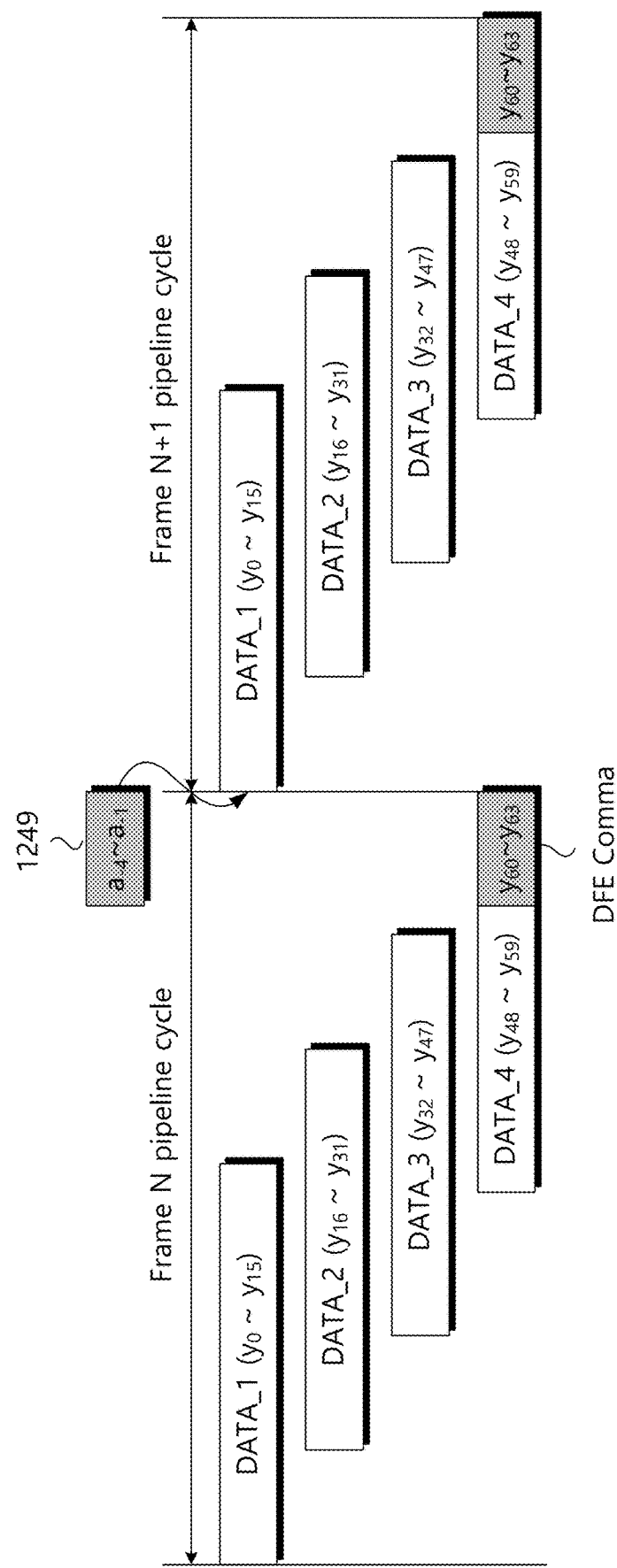
FIG. 7 is a timing diagram showing examples of effects of pipelined operations according to some embodiments of the present disclosure.

FIG. 7 is a timing diagram showing effects of pipelined operations according to some embodiments of the present disclosure. Referring to FIG. 7, latency can be reduced by using the DFE comma of the present disclosure in a pipelined DFE operation for one data frame. Here, one data frame may correspond to 64-symbols, and the DFE comma may correspond to the last symbols $y_{60}$ to $y_{63}$ of the data frame. And the DFE comma 1249 fixed to the same bit value as the last symbols $y_{60}$ to $y_{63}$ may be stored in a specific memory. Here, it is assumed that the pipeline operation consists of four stages.

The pipeline operation for the (N)th data frame may be executed in the pipelined DFE 1246 of the digital signal processor 1240. At this time, the (N)th data frame may be divided into four data units (DATA_1, DATA_2, DATA_3, and DATA_4) and pipelined. And the end (e.g., 8-bit) of the last data unit DATA_4 may be defined as a DFE comma. Similarly, a comma pattern 1249 having the same bit value as the DFE comma may be stored in advance in a buffer or memory provided in the pipelined DFE 1246. When the pipeline operation on the (N)th data frame is completed, the DFE determination values $a_0$ to $a_{63}$ for the (N)th data frame $y_0$ to $y_{63}$ may be output.

Then, the pipeline operation on the (N+1)th data frame may be executed in the pipelined DFE 1246 of the digital signal processor 1240. In this case, for the decision feedback equalization operation of the (N+1)th data frame, the number of decision values corresponding to the size of the tap may be used among DFE decision values $a_0$ to $a_{63}$ of the previously output (N)th data frame. However, the pipelined DFE 1246 of the present disclosure may use the comma pattern 1249 stored as a fixed value in a buffer or memory instead of the DFE decision values $a_{60}$ to $a_{63}$. By using the comma pattern 1249 of this fixed value, the pipeline operation on the (N+1)th data frame may be executed as soon as the (N+1)th data frame $y_0$ to $y_{63}$ is delivered without having to wait for the decision value of the (N)th data frame.

Figure 8:
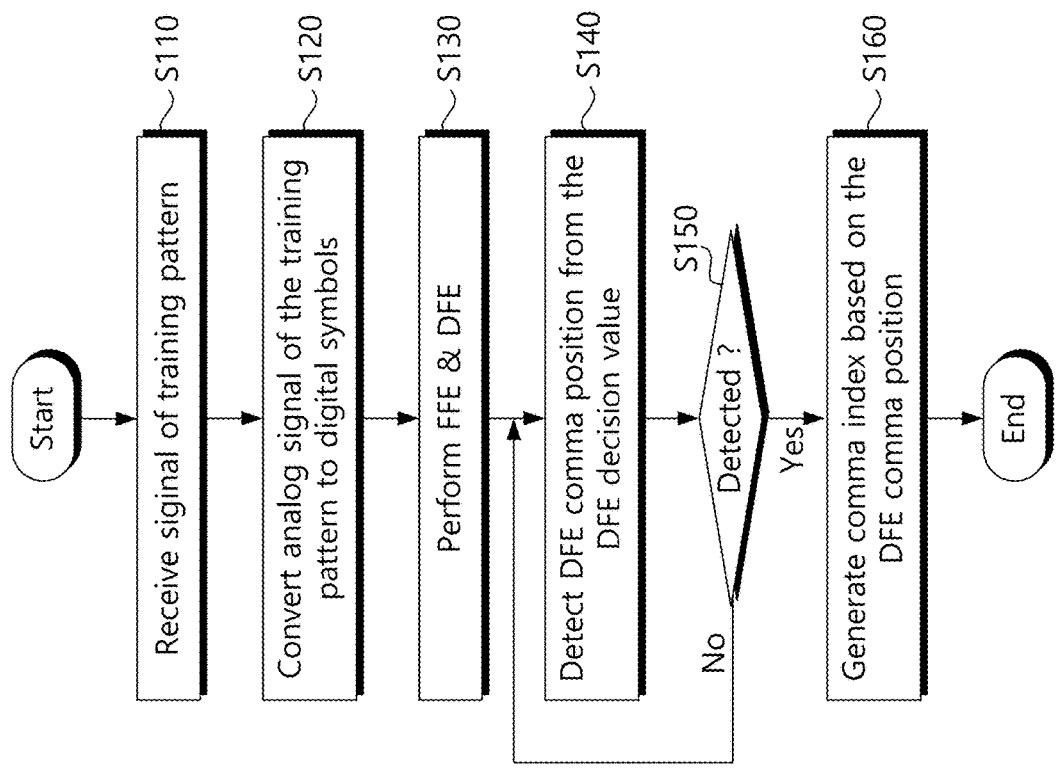
FIG. 8 is a flowchart showing a training procedure for determining a comma index for decision feedback equalization operation according to some embodiments of the present disclosure.

FIG. 8 is a flowchart showing a training procedure for determining a comma index for decision feedback equalization operation of the present disclosure. Referring to FIG. 8, the communication system 1000 (see FIG. 1) may perform training for determining a comma index of a data frame during initialization or booting. For training, the transmitter 1100 may transmit a training pattern to the receiver 1200 (see FIG. 1). In particular, for training to determine the comma index of the present disclosure, the transmitter (1100, see FIG. 1) may transmit a training pattern of a data frame structure including the above-described DFE comma.

In operation S110, the receiver 1200 may receive a training pattern in the form of an analog signal transmitted from the transmitter 1100. The training pattern may be filtered or amplified in the analog front end 1210 (see FIG. 3).

In operation S120, the training pattern received as an analog signal may be converted into a digital signal. That is, the ADC 1220 (see FIG. 3) may convert the training pattern output from the analog front end 1210 into a digital signal or digital symbols. For example, the ADC 1220 may convert an analog signal transmitted in the PAM4 method into a multi-level digital signal.

In operation S130, an equalization operation may be performed on the received data frames by the feed forward equalizer 1244 (see FIG. 3) and the pipelined DFE 1246 (see FIG. 3). The training operation may be a procedure for determining the comma index. Accordingly, the pipelined DFE 1246 may use the DFE determination value for one data frame as feedback data for DFE calculation of a subsequent data frame without using a DFE comma provided as a fixed value.

In operation S140, the position of the DFE comma in the received data frame may be determined based on the DFE determination value. The comma detector 1248 (see FIG. 3) may detect the location of the DFE comma using a DFE comma pattern of a fixed value.

In operation S150, the comma detector 1248 may detect a position of a part matching the DFE comma pattern in the data frame output as the determined value. If the part identical to the DFE comma pattern is detected in the determined data frame ('Yes' branch from operation S150), the procedure moves to operation S160. On the other hand, if the part matching the DFE comma pattern is not detected in the determined data frame ('No' branch from operation S140), the procedure returns to operation S140. The comma detector 1248 may continue to compare with the DFE comma pattern while sliding through the determined data frame.

In operation S160, the comma detector 1248 may output a frame position matching the DFE comma pattern in the determined data frame as a comma index. For example, the comma detector 1248 may determine the comma index as '50' when 50th to 53rd symbols among 64 symbols of the determined data frame match the DFE comma pattern. If the comma index is generated as '50', the FIFO buffer 1230 may recognize 50th to 53rd symbols as DFE commas during normal operation. And the FIFO buffer 1230 may be configured to perform synchronization of the data frame by rearranging the identified DFE comma at the end of the data frame.

In the above, the training procedure of detecting the position of the DFE comma and generating the comma index corresponding to the detected position has been described. The comma index determined through training may be used for frame synchronization of the receiver 1200 in a normal operation mode after training is finished. A procedure for performing frame synchronization using a comma index obtained through training will be described in greater detail with reference to FIG. 9.

Figure 9:
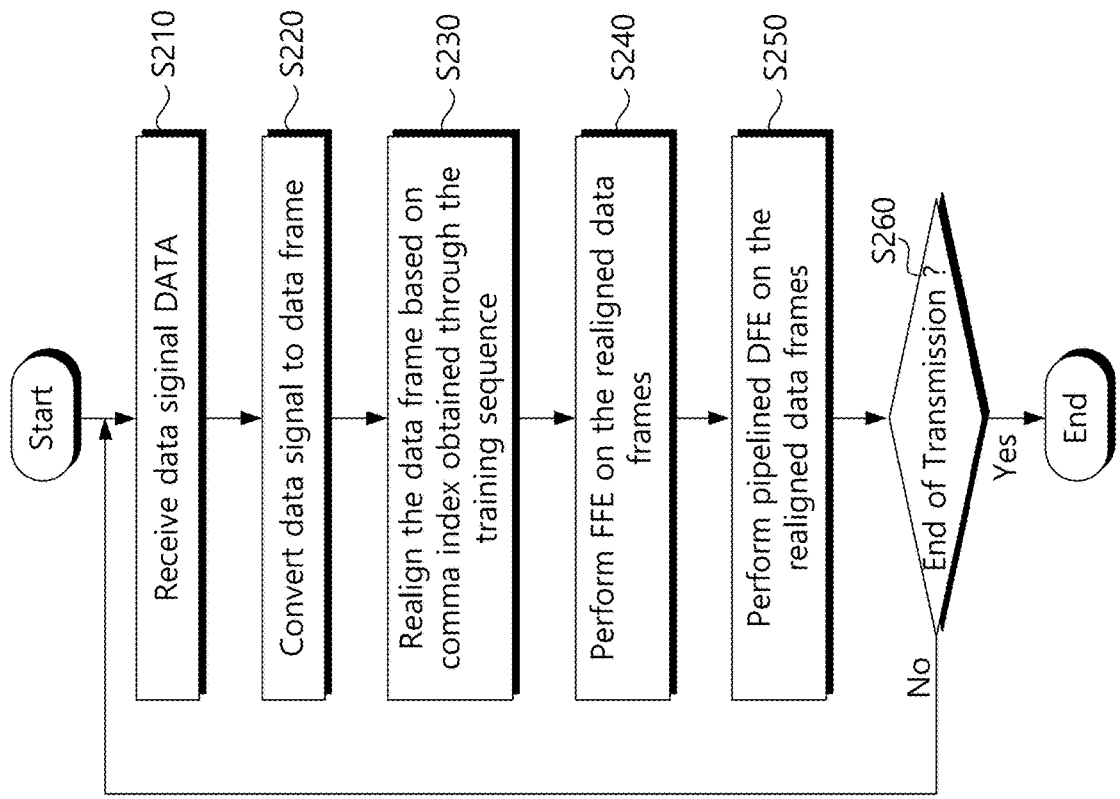
FIG. 9 is a flowchart illustrating a method of performing frame synchronization and decision feedback equalization operations using a comma index obtained through training.

FIG. 9 is a flowchart illustrating a method of performing frame synchronization and decision feedback equalization operations using a comma index obtained through training. Referring to FIG. 9, a receiver (1200, see FIG. 1) may perform a decision feedback equalization operation on a received data frame using a comma index obtained through training.

In operation S210, the receiver 1200 may receive the data signal DATA transmitted from the transmitter 1100. The received data signal DATA may be filtered or amplified by the analog front end 1210 (see FIG. 3). For example, the analog front end 1210 may include a continuous time linear equalizer CTLE or a variable gain amplifier VGA. The amplitude of the attenuated high-frequency component of the data signal DATA may be amplified through the continuous-time linear equalizer CTLE. In addition, jitter and noise boosted according to amplification of high-frequency components can be reduced through a variable gain amplifier VGA.

In operation S220, the analog data signal DATA may be converted into a digital signal by the ADC 1220 (see FIG. 3). For example, the ADC 1220 may convert the data signal DATA transmitted in the PAM4 method into a multi-level digital symbol. The ADC 1220 may convert one PAM4 level into bits corresponding to one symbol including data bits and error information.

In operation S230, rearrangement or synchronization of data frames using the comma index acquired through training may be performed. The FIFO buffer 1242 may rearrange data streams transmitted from the ADC 1220 in units of data frames according to comma indexes. The FIFO buffer 1242 may use a comma index to determine the same boundary for sequentially transmitted symbol bits as the transmission data frame. And the FIFO buffer 1242 may reconstruct the data frame so that the symbols corresponding to the DFE comma are positioned at the rearmost part. Synchronized data frames using the comma index may be passed to feed forward equalizer 1240.

In operation S240, a feed forward equalization operation may be applied to the synchronized data frame by the feed forward equalizer 1244 (see FIG. 3). The feed forward equalizer 1244 may remove the effect of pre-ghost on symbols included in data frames. The feed forward equalizer 1244 may correct inter-symbol interference ISI for an input data frame.

In operation S250, the pipelined DFE 1246 (see FIG. 3) may perform a decision feedback equalization operation in pipeline method on each of the data frames provided from the feed forward equalizer 1244 and may output a decision value Dk. In particular, the pipelined DFE 1246 may use the DFE comma of the data frame to perform a high-speed decision feedback equalization operation. In order to perform the decision feedback equalization operation, the result value determined in one data frame may be used in the operation of the next data frame. However, in the present disclosure, the end of one data frame may be designated as a DFE comma field with a fixed value. Accordingly, even in a state in which all decision values are not output in a first data frame, the decision feedback equalization operation of a second data frame may be started by using the DFE comma, where the second data frame is after (immediately after) the first data frame.

In operation S260, the receiver 1200 may determine whether transmission of the data signal DATA from the transmitter 1100 has been terminated. When transmission of the data signal DATA is no longer present in the transmitter 1100 ('Yes' branch from operation S260), data reception and filtering operations in the receiver 1200 may be terminated. On the other hand, if the transmission of the data signal DATA is not terminated in the transmitter 1100 ('No' branch from operation S260), the process may return to operation S210 to continue receiving and filtering the data signal DATA.

In the above, the digital signal processing procedure of the receiver 1200 using the comma index obtained through training has been briefly described. The comma index determined through training may be used for frame synchronization for equalization operation during normal operation. In addition, the pipelined DFE 1246 of the present disclosure may minimize the delay caused by the increase of the feedback path through a pipeline equalization operation using the DFE comma.

Figure 10:
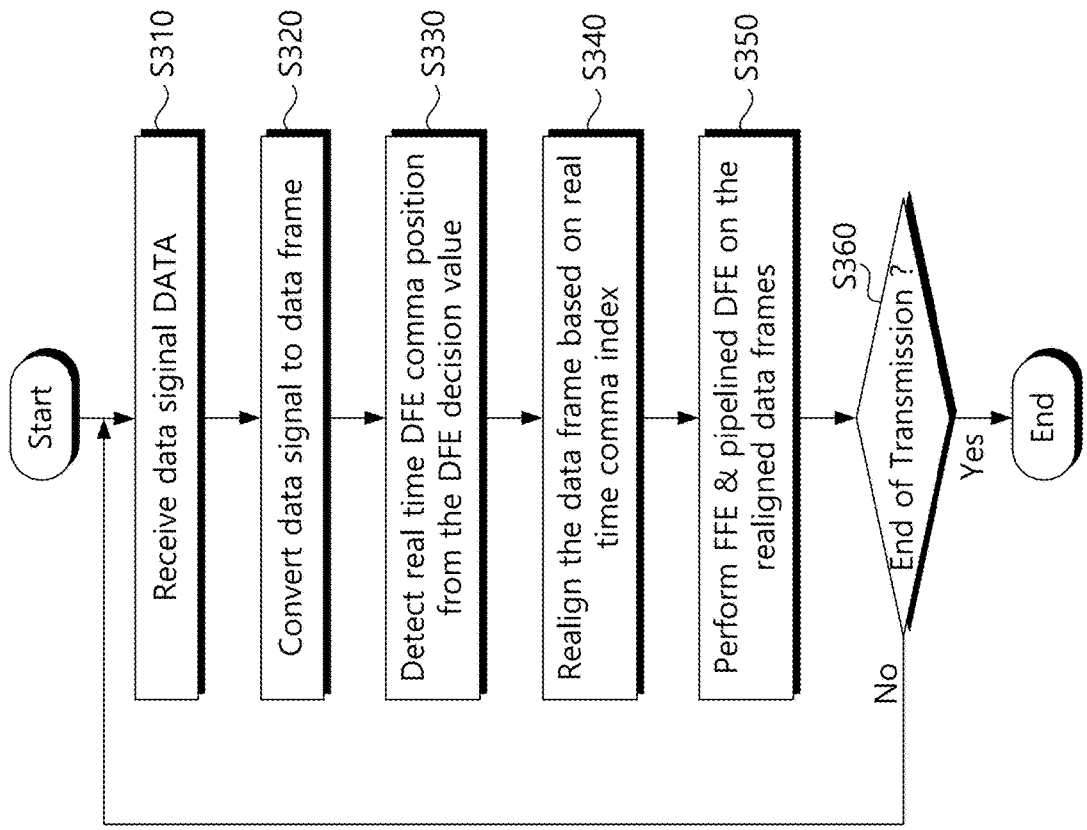
FIG. 10 is a flowchart illustrating a method of performing real-time comma index detection and frame synchronization according to some embodiments of the present disclosure.

FIG. 10 is a flowchart illustrating a method of performing real-time comma index detection and frame synchronization according to some embodiments of the present disclosure. Referring to FIG. 10, a comma index may be detected in real time during normal operation rather than training, and frame synchronization and decision feedback equalization may be performed using the detected comma index.

In operation S310, the receiver 1200 may receive the data signal DATA transmitted from the transmitter 1100. The received data signal DATA may be filtered or amplified by the analog front end 1210 (see FIG. 3).

In operation S320, the analog data signal DATA may be converted into a digital signal by the ADC 1220 (see FIG. 3).

In operation S330, the position of the DFE comma in the received data frame may be determined based on the DFE determination value. The comma detector 1248 (see FIG. 3) may detect the position of the DFE comma in real time using a predetermined DFE comma pattern. The comma detector 1248 may generate a frame position matching the DFE comma pattern as the comma index from the DFE decision value.

In operation S340, realignment or synchronization of data frames using the generated comma index may be performed. The FIFO buffer 1242 may rearrange data streams transmitted from the ADC 1220 in units of data frames according to comma indexes. The FIFO buffer 1242 may use the comma index to determine frame boundaries of symbol bits. The FIFO buffer 1242 may reconstruct the data frame so that the symbols corresponding to the DFE comma are positioned at the rearmost part.

In operation S350, an equalization operation may be performed on the synchronized data frame by the feed forward equalizer 1244 (see FIG. 3) and the pipelined DFE 1246. In particular, the pipelined DFE 1246 may perform a high-speed decision feedback equalization operation by utilizing the DFE comma of the data frame. In order to perform the decision feedback equalization operation, the decision value of a first data frame is fed back and used in the operation of a second data frame. In the present disclosure, the end of one data frame is set to a DFE comma with a fixed value. Accordingly, even in a state in which all decision values are not output for the first data frame, the decision feedback equalization operation of the second data frame may be started using the DFE comma.

In operation S360, the receiver 1200 may determine whether transmission of the data signal DATA from the transmitter 1100 has been terminated. When transmission of the data signal DATA is no longer present in the transmitter 1100 ('Yes' branch from operation S360), data reception and filtering operations in the receiver 1200 may be terminated. On the other hand, if the transmission of the data signal DATA is not terminated in the transmitter 1100 ('No' branch from operation S360), the process may return to operation S310 to start or continue receiving and filtering the data signal DATA.

In the above, the digital signal processing procedure of the receiver 1200 using the comma index acquired in real time has been briefly described. In the case of using the comma index determined in real time without separate training, it is expected that high frame synchronization can be implemented.

Figure 11:
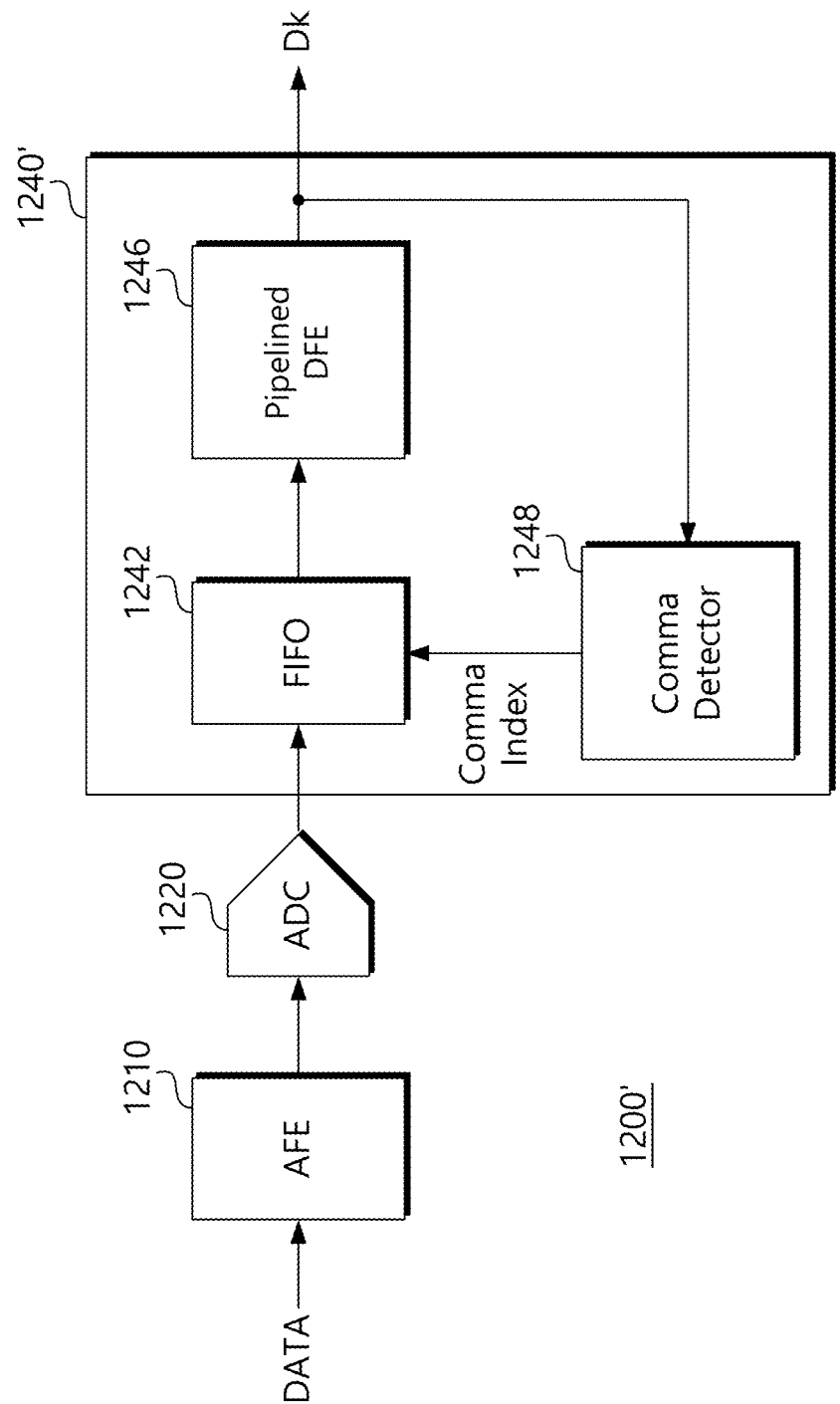
FIG. 11 is a block diagram showing an example of a structure of a receiver according to some embodiments of the present disclosure.

FIG. 11 is a block diagram showing the structure of a receiver according to some embodiments of the present disclosure. Referring to FIG. 11, a receiver 1200' according to some embodiments of the present disclosure may include an analog front end 1210, an ADC 1220, a FIFO buffer 1242, a pipelined DFE 1246, and a comma detector 1248. In some embodiments, the digital signal processor 1240' may not include a feed forward equalizer FFE. Functions of analog front end 1210, ADC 1220, FIFO buffer 1242, pipelined DFE 1246, and comma detector 1248 may be substantially the same as those of FIG. 3 described above. Therefore, a detailed description of these will be omitted here in the interest of brevity.

Figure 12:
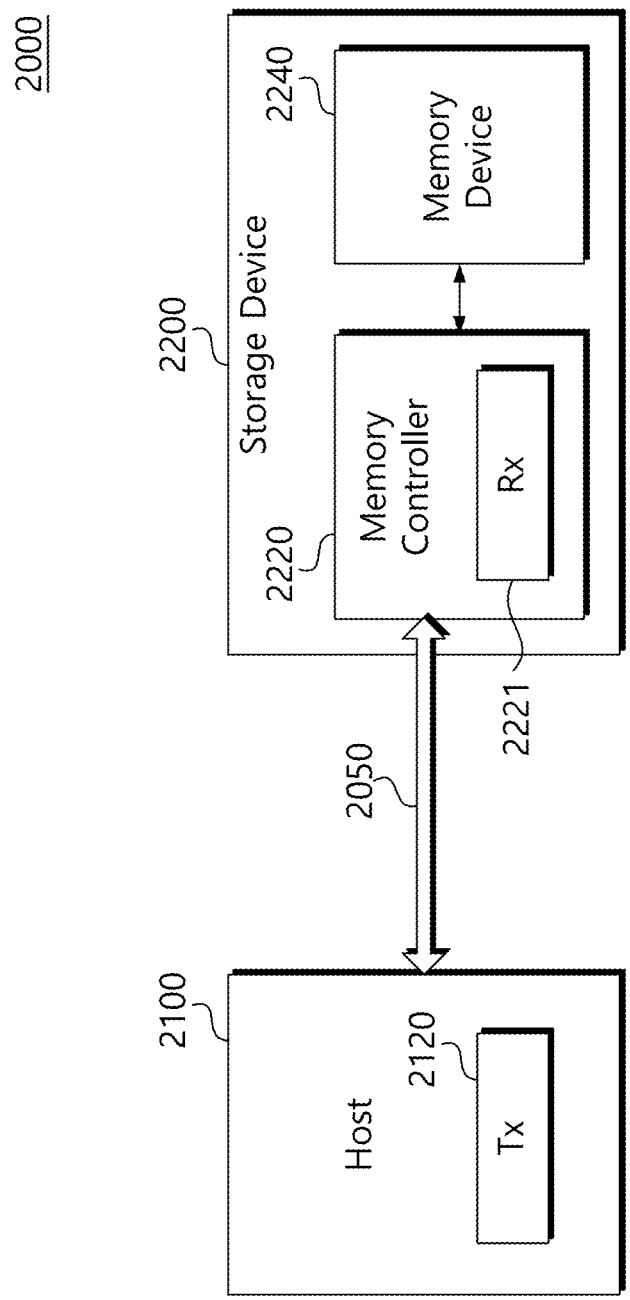
FIG. 12 is a block diagram illustrating a memory system including a transmitter and a receiver according to some embodiments of the present disclosure.

FIG. 12 is a block diagram illustrating a memory system including a transmitter and a receiver according to some embodiments of the present disclosure. Referring to FIG. 12, a memory system 2000 may include a host 2100, a storage device 2200, and an interface 2050. The storage device 2200 may include a memory controller 2220 and a memory device 2240.

The interface 2050 may use an electrical signal and/or an optical signal, and as non-limiting examples, a serial advanced technology attachment SATA interface, a SATA express (SATAe) interface, a serial attached SCSI (SAS) interface, Universal Serial Bus (USB) interface, PCIe interface, or a combination of two or more thereof. The host 2100 and the storage device 2200 may include SerDes for serial communication.

In some embodiments, the memory system 2000 may communicate with the host 2100 and may be removably couplable to the host 2100. The storage device 2200 may be a volatile memory or a nonvolatile memory, and the memory system 2000 may also be referred to as a storage system. For example, the memory system 2000 may include a solid-state drive (SSD), an embedded SSD (eSSD), a multimedia card (MMC), an embedded multimedia card (eMMC), or the like.

The memory controller 2220 may control the memory device 2240 in response to a request received from the host 2100 through the interface 2050.

Meanwhile, the transmitter 2120 to which examples of embodiments of the present disclosure are applied may be implemented in the host 2100, and the receiver 2221 may be included in the memory controller 2220. When transmitting a data signal, the transmitter 2120 may add and transmit a DFE comma of a fixed pattern within a data frame. In addition, the receiver 2221 may perform frame synchronization using the DFE comma and perform latency-free decision feedback equalization on the synchronized data frame. When performing the feedback equalization operation, the receiver 2221 may start the decision feedback equalization operation of the next data frame using the DFE comma even in a state in which all decision values are not output in the data frame prior to the next data frame. Accordingly, latency generated according to an increase in tap paths during pipelined determination feedback equalization operation of the receiver 2221 may be minimized. As a result, according to the structure of the data frame of the present disclosure, high-speed and low-power pipelined equalization operation in the receiver 2221 may be possible.

Meanwhile, in the illustrated memory system 2000, it has been described that the transmitter 2120 is included in the host 2100 and the receiver 2221 is included in the memory controller 2220, but the present disclosure is not limited thereto. That is, it may be understood that the host 2100 may include the receiver Rx and the memory controller 2220 may include the transmitter Tx.

The above are some specific embodiments for carrying out the present disclosure. In addition to the above-described embodiments, the present disclosure may encompass simple design changes or easily changeable embodiments. In addition, the present disclosure may include techniques that can be easily modified and implemented using the embodiments. Therefore, the scope of the present disclosure should not be limited to the above-described embodiments, and is defined by the claims and equivalents of the claims of the present disclosure provided below.

What is claimed is:

1. A receiver for receiving a data signal, comprising:
   an analog-to-digital converter configured to convert the data signal into digital data;
   a first-in-first-out buffer configured to determine a frame boundary of the digital data by referring to a comma index to segment the digital data into units of data frames according to the determined frame boundary;
   a decision feedback equalizer configured to process a data frame output from the first-in-first-out buffer through a decision feedback equalization operation, wherein feedback data used in the decision feedback equalization operation of the data frame uses a predetermined fixed pattern; and
   a comma detector configured to generate the comma index by comparing a determined value of the data frame with the predetermined fixed pattern,
   wherein the data frame includes a preceding data field in which a message is stored and a subsequent comma field having the same bit value as the predetermined fixed pattern.

2. The receiver of claim 1, wherein the decision feedback equalizer comprises a plurality of taps for receiving the feedback data, and wherein a length of the predetermined fixed pattern is equal to or greater than a number of the plurality of taps.

3. The receiver of claim 1, wherein the first-in-first-out buffer aligns the preceding data field and the subsequent comma field from the digital data provided as a stream into the data frame and outputs the data frame.

4. The receiver of claim 1, wherein the comma detector is configured to activate during a training operation of the receiver to generate the comma index.

5. The receiver of claim 1, wherein the comma detector is configured to generate the comma index in real time during normal operation of the receiver.

6. The receiver of claim 1, wherein the data signal corresponds to a pulse amplitude modulated signal.

7. The receiver of claim 1, further comprising:
a feed forward equalizer configured to perform feed forward filtering on the data frame output from the first-in-first-out buffer.

8. The receiver of claim 1, wherein in the data signal, a first pattern and a second pattern having a complement relationship with each other are alternately transmitted as comma fields for DC balance.

9. A method of operating a receiver, the receiver comprising a decision feedback equalizer, the method comprising:
converting a received data signal into a digital symbol stream;
synchronizing the digital symbol stream into a data frame corresponding to a transmitted frame unit; and
performing a decision feedback equalization operation on the data frame using a predetermined fixed pattern as a feedback decision value,
wherein the data frame includes a data field at a front end and a comma field at a rear end, and wherein the comma field has a same bit value as the predetermined fixed pattern.

10. The method of claim 9, wherein in the synchronizing, a boundary of the data frame is determined using a comma index indicating a position of the predetermined fixed pattern.

11. The method of claim 10, further comprising:
generating the comma index using the predetermined fixed pattern.

12. The method of claim 11, wherein the comma index is generated using a training pattern in a training sequence of the receiver.

13. The method of claim 11, wherein the comma index is generated in real time based on a decision value of a decision feedback equalization operation for the data frame.

14. The method of claim 9, wherein the received data signal corresponds to a transmitted frame unit including the data field and the comma field at the transmitter.

15. The method of claim 9, wherein the decision feedback equalizer includes a plurality of taps for receiving a fed back decision value, and wherein a length of the comma field is equal to or longer than a number of the plurality of taps.

16. The method of claim 9, further comprising:
performing feed forward filtering on the synchronized data frame.

17. A communication system comprising:
a transmitter configured to modulate a transmission data frame including a data field at a front end and a comma field at a rear end into an analog data signal and to transmit the modulated analog data signal; and
a receiver configured to receive the analog data signal and to restore the data frame,
wherein the receiver comprises:
an analog-to-digital converter configured to convert the analog data signal into a digital symbol; and
a digital signal processor configured to synchronize the digital symbol with the transmitted data frame using a comma index and to filter the synchronized data frame by applying a decision feedback equalization operation, and
wherein feedback data used in the decision feedback equalization operation comprises a fixed pattern having a same bit value as the comma field.

18. The system of claim 17, wherein the comma index includes location information of the comma field in the synchronized data frame.

19. The system of claim 17, wherein the digital signal processor comprises:
a first-in-first-out buffer configured to determine a frame boundary of the digital symbol by referring to the comma index and to output the digital symbol as the data frame according to the frame boundary;
a feed forward equalizer configured to perform feed forward filtering on the data frame output from the first-in-first-out buffer; and
a decision feedback equalizer configured to perform the decision feedback equalization operation on the data frame output from the feed forward equalizer by using the fixed pattern as feedback data.

20. The system of claim 19, wherein the digital signal processor includes a comma detector for generating the comma index by comparing a decision value output from the decision feedback equalizer with the fixed pattern.

* * * * *

UNITED STATES PATENT AND TRADEMARK OFFICE
CERTIFICATE OF CORRECTION

| | | |
|---|---|---|
| PATENT NO. | : 12,418,444 B2 | Page 1 of 1 |
| APPLICATION NO. | : 18/422058 | |
| DATED | : September 16, 2025 | |
| INVENTOR(S) | : Young Choi et al. | |

It is certified that error appears in the above-identified patent and that said Letters Patent is hereby corrected as shown below:

On the Title Page

Item (54) and in the Specification Column 1 Lines 1-2 Title:
"EQUALIZERS, COMMUNICATION SYSTEMS AND OPERATING METHODS THEREOF"
Should read:
"RECEIVERS INCLUDING HIGH SPEED DECISION FEEDBACK EQUALIZERS, COMMUNICATION SYSTEMS AND OPERATING METHODS THEREOF"

Signed and Sealed this
Thirteenth Day of January, 2026

John A. Squires
*Director of the United States Patent and Trademark Office*